United States Patent [19]

Breitenfellner

[11] 4,401,784

[45] Aug. 30, 1983

[54] THERMOPLASTIC MOULDING COMPOSITION AND USE THEREOF

[75] Inventor: Franz Breitenfellner, Bensheim, Fed. Rep. of Germany

[73] Assignee: Ciba-Geigy Corporation, Ardsley, N.Y.

[21] Appl. No.: 340,686

[22] Filed: Jan. 20, 1982

[30] Foreign Application Priority Data

Jan. 27, 1981 [CH] Switzerland ............................ 512/81

[51] Int. Cl.$^3$ .............................................. C08L 67/02
[52] U.S. Cl. ..................................... 524/424; 524/605
[58] Field of Search ................. 524/424, 411, 412, 605

[56] References Cited

U.S. PATENT DOCUMENTS

| | | | |
|---|---|---|---|
| 4,000,109 | 12/1976 | Smith et al. | 524/405 |
| 4,043,971 | 8/1977 | Wurmb et al. | 524/423 |
| 4,052,356 | 10/1977 | Breitenfellner et al. | 524/447 |
| 4,102,853 | 7/1978 | Kawamura et al. | 524/424 |
| 4,107,231 | 8/1978 | Wurmb et al. | 524/411 |

FOREIGN PATENT DOCUMENTS

| | | |
|---|---|---|
| 2125117 | 9/1972 | France . |
| 2442260 | 6/1980 | France . |
| 54-124053 | 9/1979 | Japan . |

OTHER PUBLICATIONS

Chemical Abstracts, vol. 92, 1980, 92:77458n.
CA, 93, 97024s, (1980).

*Primary Examiner*—Lewis T. Jacobs
*Attorney, Agent, or Firm*—Luther A. R. Hall

[57] ABSTRACT

The invention relates to moulding compositions based on thermoplastic polyesters and containing finely particulate dolomite. The moulded articles obtained with these compositions have increased stiffness and dimensional stability under heat. In the presence of flame retardants and/or a reinforcing filler, the addition of dolomite also improves the tracking resistance.

4 Claims, No Drawings

THERMOPLASTIC MOULDING COMPOSITION AND USE THEREOF

The present invention relates to a thermoplastic moulding composition which contains dolomite and, optionally, reinforcing fillers, flame retardants and other conventional additives, and to the use of said composition for the production of moulded articles.

Thermoplastic polyesters are valuable moulding compounds which are widely used in the art. In order to satisfy different end uses, it is usual to add fillers to the polyesters, with which fillers specific mechanical and electrical properties can be improved. To increase the dimensional stability under heat there may be added fillers such as glass fibres, while flame retardants may be added to diminish combustibility. These additives, however, diminish the tracking resistance, which is an important property for utilities in the electrical field.

Fillers for improving the tracking resistance are already known, e.g. kaolin (German Offenlegungsschrift No. 2 616 754), calcium or barium sulfate (German Offenlegungsschrift No. 2 524 121) and metal borates (German Offenlegungsschrift No. 2 534 762). A disadvantage of these fillers is a possible decrease in the inherent colour, which may be a hindrance to colouring with pigments.

It is the object of the present invention to provide thermoplastic polyester moulding compositions which have improved stiffness and dimensional stability under heat and which, on account of these improved properties, make it possible to replace reinforcing fillers wholly or in part and are accordingly able to improve the tracking resistance of the moulded articles obtained therefrom and also of flame-proofed moulded articles. In general, the moulded articles obtained with the moulding composition of the invention will also have a clear inherent colour and will not drip when subjected to burning.

Accordingly, the invention provides a moulding composition based on thermoplastic polyesters and comprising, based on the total composition, (a) 40 to 99% by weight of a thermoplastic polyester,
(b) 1 to 60% by weight of finely particulate dolomite, and
(c) optionally further conventional additives.

Linear thermoplastic polyesters suitable for the moulding materials of the invention are preferably crystalline or fine-crystalline and thus have, in particular, a melting point of at least 150° C. However, they may also be amorphous, in which case the polyester then preferably has a glass transition temperature of at least 70° C., most preferably of at least 100° C. The intrinsic viscosity of the polyesters is preferably at least 0.6 dl/g, most preferably at least 0.8 dl/g.

The polyesters may be homopolymers or copolymers which are derived from aliphatic, cycloaliphatic or aromatic dicarboxylic acids and diols or hydroxycarboxylic acids. Mixtures of these polyesters are also suitable. Their composition depends substantially on the desired properties for a specific end use.

The aliphatic dicarboxylic acids may contain 2 to 40 carbon atoms, the cycloaliphatic dicarboxylic acids 6 to 10 carbon atoms, the aromatic dicarboxylic acids 8 to 14 carbon atoms, the aliphatic hydroxycarboxylic acids 2 to 12 carbon atoms, and the aromatic and cycloaliphatic hydroxycarboxylic acids 7 to 14 carbon atoms.

The aliphatic diols may contain 2 to 12 carbon atoms, the cycloaliphatic diols 5 to 8 carbon atoms and the aromatic diols 6 to 16 carbon atoms. By aromatic diols are meant those in which two hydroxyl groups are linked to one aromatic hydrocarbon radical or to different aromatic hydrocarbon radicals.

Further, the polyesters may also be branched with small amounts, e.g. 0.1 to 3 mol.%, based on the dicarboxylic acids, of more than bifunctional monomers (e.g. pentaerythritol or trimellitic acid).

Polyesters consisting of at least three monomers may contain these in statistical distribution or they may be block polymers.

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those containing 2 to 40 carbon atoms, e.g. oxalic acid, malonic acid, dimethylmalonic acid, succinic acid, octadecylsuccinic acid, pimelic acid, adipic acid, trimethyladipic acid, sebacic acid, azelaic acid, and dimeric acids (dimerisation products of unsaturated aliphatic carboxylic acids, such as oleic acid), alkylated malonic and succinic acids, such as octadecylsuccinic acid.

Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxymethylcyclohexane, 4,4'-dicyclohexyldicarboxylic acid.

Examples of suitable aromatic dicarboxylic acids are: in particular terephthalic acid, isophthalic acid, o-phthalic acid, as well as 1,3-, 1,4-, 2,6- or 2,7-naphthalenedicarboxylic acid, 4,4'-diphenyldicarboxylic acid, 4,4'-diphenylsulfone-dicarboxylic acid, 1,1,3-trimethyl-5-carboxy-3-(p-carboxyphenyl)indane, 4,4'-diphenyl ether dicarboxylic acid and bis-p-(carboxyphenyl)methane.

The aromatic dicarboxylic acids are preferred, with terephthalic acid, isophthalic acid and orthophthalic acid being particularly preferred.

Further suitable dicarboxylic acids are those which contain —CO—NH— groups. They are described e.g. in German Offenlegungsschrift No. 2 414 349. Dicarboxylic acids which contain N-heterocyclic rings are also suitable, for example those which are derived from carboxyalkylated, carboxyphenylated or carboxybenzylated monoamino-s-triazinedicarboxylic acids (cf. German Offenlegungsschrift specification Nos. 2 121 184 and 2 533 675), mono- or bishydantoins, unsubstituted or halogenated benzimidazolones, or parabanic acid. The carboxyalkyl group may contain 3 to 20 carbon atoms.

Suitable aliphatic diols are the linear and branched aliphatic glycols, in particular those containing 2 to 12, especially 2 to 6, carbon atoms in the molecule, for example: ethylene glycol, 1,2- or 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is e.g. 1,4-dihydroxycyclohexane.

Further suitable aliphatic diols are e.g. 1,4-dihydroxymethylcyclohexane, aromatic-aliphatic diols, such as p-xylylene glycol or 2,5-dichloro-p-xylylene glycol, 2,2-(β-hydroxyethoxyphenyl)propane, and polyoxyalkylene glycols such as diethylene glycol, triethylene glycol or polyethylene glycol. The alkylenediols are preferably linear and contain preferably 2 to 4 carbon atoms.

Preferred diols are 1,4-dihydroxycyclohexane and 1,4-dihydroxymethylcyclohexane. Ethylene glycol and 1,4-butanediol are particularly preferred.

Further suitable aliphatic diols the β-hydroxyalkylated, especially β-hydroxyethylated, bisphenols such as 2,2-bis[4'-(β-hydroethoxy)phenyl]propane. Further bisphenols are mentioned later.

A further group of suitable diols comprises the heterocyclic diols described in German Offenlegungsschrift specification Nos. 1 812 003, 2 342 432, 2 342 372 and 2 453 326. Examples are:

N,N'-bis-(β-hydroxyethyl-5,5-dimethyl)hydantoin, N,N'-bis-(β-hydroxypropyl-5,5-dimethyl)hydantoin, methylene-bis-[N,N'-(β-hydroxyethyl)-5-methyl-5-ethylhydantoin], methylene-bis-[N-(β-hydroxyethyl)-5,5-dimethylhydantoin], N,N'-bis-(β-hydroxyethyl)benzimidazolone, -(tetrachloro)-benzimidazolone or -(tetrabromo)benzimidazolone.

Suitable aromatic diols are mononuclear diphenols and, in particular, binuclear diphenols which carry a hydroxyl group at each aromatic nucleus. Aromatic will be understood to mean aromatic hydrocarbon radicals such as phenylene or naphthylene. In addition e.g. to hydroquinone, particular mention is to be made of those bisphenols which may be illustrated by the following formula

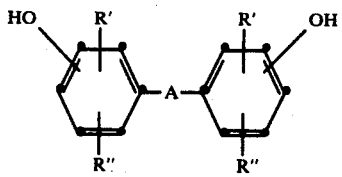

in which the hydroxyl groups may be in the meta-position, but preferably in the para-position, R' and R" may be alkyl of 1 to 6 carbon atoms, halogen such as chlorine or bromine and, in particular, hydrogen, A can be a direct bond or is O, S, SO₂, unsubstituted or substituted alkylidene, cycloalkylidene or alkylene.

Unsubstituted or substituted alkylidene is e.g.: ethylidene, 1,1- or 2,2-propylidene, 2,2-butylidene, 1,1-isobutylidene, pentylidene, hexylidene, heptylidene, octylidene, dichloroethylidene and trichloroethylidene.

Unsubstituted or substituted alkylene is e.g.: methylene, ethylene, phenylmethylene, diphenylmethylene, methylphenylmethylene. Unsubstituted or substituted cycloalkylidene is e.g.: cyclopentylidene, cyclohexylidene, cycloheptylidene and cyclooctylidene.

Examples of bisphenols are:
bis-(p-hydroxyphenyl)ether or thioether, bis-(p-hydroxyphenyl)sulfone, bis-(p-hydroxyphenyl)methane, 1,2-bis-(p-hydroxyphenyl)ethane, 1-phenyl-bis-(p-hydroxyphenyl)methane, diphenyl-bis-(p-hydroxyphenyl)methane, diphenyl-bis-(p-hydroxyphenyl)methane, 2,2-bis-(4'-hydroxy-3'-dimethylphenyl)propane, 1,1- or 2,2-bis-(p-hydroxyphenyl)butane, 1,1-dichloro- or 1,1,1-trichloro-2,2-bis-(p-hydroxyphenyl)-ethane, 1,1-bis-(p-hydroxyphenyl)cyclopentane and, in particular, 2,2-bis-(p-hydroxyphenyl)propane (bisphenol A) and 1,1-bis-(p-hydroxyphenyl)cyclohexane (bisphenol C).

Suitable polyesters of hydroxycarboxylic acids are e.g.: polycaprolactone, polypivalolactone or the polyesters of 4-hydroxycyclohexanecarboxylic acid or 4-hydroxybenzoic acid.

Polyesters with aromatic dicarboxylic acids have attained the greatest importance, especially the polyalkylene terephthalates. Preferred moulding compositions of this invention are therefore those in which the polyester consists of at least 30 mol.%, preferably at least 40 mol.%, of aromatic dicarboxylic acids and at least 30 mol.%, preferably at least 40 mol.%, of alkylenediols containing preferably 2 to 12 carbon atoms, based on the polyester.

In this case the alkylenediol is in particular linear and contains 2 to 6 carbon atoms, e.g. ethylene glycol, triethylene glycol, tetraethylene glycol or hexamethylene glycol, and the aromatic dicarboxylic acid is terephthalic acid and/or isophthalic acid. Particularly preferred polyesters are polyethylene and poly-1,4-butylene terephthalate and also copolyesters based on polyethylene terephthalate and poly-1,4-butylene terephthalate.

The moulding composition of the invention can additionally contain a reinforcing (fibrous) filler, e.g. asbestos fibres, carbon fibres or, in particular, glass fibres. The total amount of reinforcing filler and dolomite is at most 60% by weight, based on the total composition. The fillers, including dolomite, can be coated with an adhesion promoter in order to bind them better to the polyester.

The moulding composition of the invention may additionally contain 3 to 25% by weight, preferably 8 to 20% by weight, based on the polyester, of a flame-proofing additive.

Examples of suitable flame-proofing additives are organic halogen compounds, especially chlorine or bromine compounds, which are used by themselves or together with synergistic compounds of the 5th main group of the Periodic Table, preferably phosphorus and antimony compounds, most preferably antimony trioxide.

Flame retardants based on organic chlorine-containing and/or bromine-containing compounds are known. They may be compounds which are incorporated in the plastics material as mixture component, or compounds which, as reactive monomers, are built into the polymer molecule. Examples of these last-mentioned compounds are tetrachlorophthalic anhydride, dichlorotetraphthalic acid or the lower alkyl esters thereof, tetrabromophthalic anhydride, tetrabromobisphenol A, N,N'-bis(β-hydroxyethyl)tetrachloro- or tetrabromobenzimidazolone.

Further examples of chlorine-containing and/or bromine-containing compounds are: polytribromostyrene, polypentabromostyrene, decabromodiphenyl, tetrabromodiphenyl, hexabromodiphenyl ether, octabromodiphenyl ether, decabromodiphenyl ether, tetrabromodiphenyl sulfide, hexabromodiphenylsulfone, 3-(2',4',6'-tribromophenoxy)-1,2-propanediol, di- or tetrabromophthalic acid and anhydrides thereof, dibromoterephthalic acid, hydroxyethylated dibromo- or tetrabromobisphenyl A, tetrabromo-1,4-(dihydroxymethyl)benzene, tetrabromobenzimidazolone, N,N'-alkylene-bis-tetrabromophthalimide as well as the chlorine-containing analogs. Further halogen-containing compounds are described e.g. in German Offenlegungsschrift No. 2 242 450.

In a preferred embodiment of the invention, the moulding composition contains 20 to 40% by weight of dolomite or 15 to 30% by weight of dolomite and 15 to 20% by weight of glass fibres.

The dolomite employed in the practice of this invention is principally finely ground natural dolomite which can have a particle size of 1 μm to 100 μm.

The thermoplastic polyesters are known and commercially available, or they can be obtained by polycondensation methods known and employed in the art.

The moulding compositions of the invention are also obtained by methods conventionally employed in the art, by incorporating the additives in the polyester during or after the polycondensation by adding them to the reaction mass or by regranulating existing granules from the melt state.

Further conventional ingredients may also be added, e.g. further fillers such as talcum, mica, metal powder, silica aerosol or glass beads, inorganic and organic pigments, fluorescent whitening agents, dulling agents, lubricants, mould release agents, crystallisation promoters, antioxidants, light stabilisers and processing stabilisers.

The moulding compositions of the invention have a clear inherent colour and so make it easier to effect coloration with pigments. They have increased dimensional stability under heat and stiffness. Flame-proofed moulding compositions or moulding compositions containing reinforcing fillers have a greatly improved tracking resistance. The tendency of flame-proofed moulding compositions to drip when subjected to burning is also inhibited even with small amounts of dolomite.

The moulding compositions can be processed to articles of daily use of all kinds by conventional methods such as casting, compression moulding, injection moulding and extruding. Examples of such articles are industrial apparatus parts, apparatus casings, household appliances, sporting goods, electrical insulations, automobile parts, circuits, boards, films and semifinished products which can be shaped by machining. Owing to the good electrical properties, a particular utility is the manufacture of moulded articles for the electrical field.

The following Examples illustrate the invention in more detail.

EXAMPLES 1 TO 6

Dolomite, in the amounts indicated in Table 1, is incorporated in polybutylene terephthalate using a laboratory kneader at a cylinder temperature of 250° C., and the moulding composition so obtained is granulated. The polybutylene terephthalate employed has a viscosity number of 147 cm$^3$/g according to DIN 53 728/3. The dolomite has an average particle size of about 5 μm. After the granules have been dried they are processed to test articles under the following conditions: cylinder temperature 250° C., mould temperature 80° C., cycle time 45 sec. The moulded articles are tested for the properties indicated in Table 1.

In the same manner, moulded articles are made from pure polybutylene terephthalate and from polybutylene terephthalate reinforced with glass fibres (30% by weight of glass fibres) and the properties are determined for comparison purposes (Examples 5 and 6).

It is evident from Table 1 that the moulded articles made from compositions of the invention have better stiffness and dimensional stability under heat as well as a lower coefficient of thermal expansion in comparison with non-reinforced polybutylene terephthalate. Compared with glass reinforced moulded articles, the moulded articles of the invention have an improved tracking resistance in accordance with method KC of DIN 53 480.

TABLE 1

| Example | Composition | Modulus of elasticity (DIN 53 547) 23° C. (N/mm$^2$) | Dimensional stability under heat ISO/R Method B (°C.) | Coefficient of thermal expansion (range from −30° C. to +30° C. (K$^{-1}$) | Tracking resistance (DIN 53 480 Method KC |
|---|---|---|---|---|---|
| 1 | 85% by weight of PBTP 15% by weight of dolomite | 3300 | 187 | $6.0 \cdot 10^{-5}$ | >600 |
| 2 | 70% by weight of PBTP 30 by weight of dolomite | 4300 | 191 | $5.3 \cdot 10^{-5}$ | |
| 3 | 55% by weight of PBTP 45% by weight of dolomite | 5800 | 196 | $4.5 \cdot 10^{-5}$ | |
| 4 | 40% by weight of PBTP 60% by weight of dolomite | 8100 | 201 | $3.3 \cdot 10^{-5}$ | >600 |
| 5 | 100% by weight of PBTP | 2700 | 160 | $8.0 \cdot 10^{-5}$ | >600 |
| 6 | 70% by weight of PBTP 30% by weight of glass fibres | 9000 | 220 | $3.0 \cdot 10^{-5}$ | 425 |

EXAMPLES 7 AND 8

Using a laboratory Ko-kneader, 20% by weight of dolomite is incorporated at 250° C. in 80% by weight of polybutylene terephthalate (viscosity number: 135 cm$^2$/g according to DIN 53 728/3) which contains 10% by weight of decabromodiphenyl oxide and 5% by weight of Sb$_2$O$_3$, based on the polymer. The resultant moulding composition is then granulated. Moulded articles are prepared in the same manner as described in Examples 1 to 6 and the properties reported in Table 2 are determined. The properties are compared with those of moulded articles made from a composition which contains the same amount of flame retardant but no dolomite (Example 8).

It is evident from the comparison that the moulded articles made from the moulding composition of the invention have a greater tracking resistance in addition to a greater stiffness and dimensional stability under heat.

TABLE 2

| Example | Composition | Modulus elasticity (DIN 53 457) 23° C. (N/mm²) | Dimensional stability under heat ISO/R 75 Method B (°C.) | Combustibilty (UL 94) length of sample 1/16 ins. | Tracking resistance (DIN 53 480 Method KC) |
|---|---|---|---|---|---|
| 7 | 80% by weight of PBTP with 10% by weight of decabromodiphenyl oxide and 5% by weight of $Sb_2O_3$, based on the polymer 20% by weight of dolomite | 3900 | 195 | V-O | 375 |
| 8 | 100% by weight of PBTP with 10% by weight of decabromodiphenyl oxide and 5% by weight of $Sb_2O_3$, based on the polymer | 2900 | 145 | V-O | 200 |

EXAMPLES 9 AND 10

Using a laboratory Ko-kneader, 30% by weight of dolomite and 20% by weight of glass fibres are incorporated at 250° C. in 50% by weight of polybutylene terephthalate (Viscosity number: 120 cm²/g according to DIN 53 728/3) which contains 10% by weight of decabromodiphenyl oxide and 5% by weight of $Sb_2O_3$, based on the polymer. The resultant moulding composition is then granulated. Moulded articles are prepared in the same manner as described in Examples 1 to 4 and the properties reported in Table 3 are determined. The properties are compared with those of moulded articles made from a composition which is reinforced with glass fibres, but contains no dolomite (Example 10).

The positive effect of dolomite on the tracking resistance is evident when testing by Method KB of DIN 53 480.

After the granules have been dried, moulded articles measuring $125 \times 12.5 \times 1.6$ mm are prepared therefrom by injection moulding (cylinder temperature 250° C., mould temperature 80° C., cycle time 45 sec.). The moulded articles are subjected to a combustibility test according to the method of UL 94 (vertical test, Underwriters Laboratory). The moulded articles of Example 11 have no tendency to drip, while those of Example 12 drip.

EXAMPLES 13 AND 14

Using a laboratory Ko-kneader, 20% by weight of dolomite are incorporated at a cylinder temperature of 250° C. in 80% by weight of an inherently flame-proofed polybutylene terephthalate copolyester of the composition described in Table 4, and the resultant moulding composition is granulated. The PBTP copolymer has a viscosity number of 150 cm³/g according

TABLE 3

| Example | Composition | Modulus of elasticity (DIN 53 457) 23° C. (N/mm²) | Combustibility (UL 94) length of sample 1/16 ins. | Tracking resistance (DIN 53 480 Method KC) |
|---|---|---|---|---|
| 9 | 50% by weight of PBTP with 8% by weight of decabromodiphenyl oxide and 4% by weight of $Sb_2O_3$, based on the polymer 20% by weight of glass fibres 30% by weight of dolomite | 10900 | V-O | 225 |
| 10 | 80% by weight of PBTP with 8% by weight of decabromodiphenyl oxide and 4% by weight of $Sb_2O_3$, based on the polymer 20% by weight of glass fibres | 8000 | V-O | 125 |

EXAMPLES 11 AND 12

The following moulding compositions are granulated at 250° C. in a laboratory Ko-kneader:

EXAMPLE 11

51.5% by weight of polybutylene terephthalate (viscosity number: 110 cm³/g)
9.5% by weight of decabromodiphenyl oxide
4.5% by weight of antimony trioxide
30.0% by weight of glass fibres
5.0% by weight of dolomite (average particle size: 3 μm).

EXAMPLE 12

56.5% by weight of polybutylene terephthalate
9.5% by weight of decabromodiphenyl oxide
4.5% by weight of antimony trioxide
30.0% by weight of glass fibres.

to DIN 53 728/3. After the granules have been dried they are processed to moulded articles under the following conditions: cylinder temperature 250° C., mould temperature 80° C., cycle time 45 sec. The properties reported in Table 4 are determined (Example 13).

In the same manner, moulded articles which contain no dolomite are prepared and the properties are determined (Example 14).

It is evident from Table 4 that the moulded articles made from the composition of the invention have greater stiffness and dimensional stability under heat and improved electrical properties.

EXAMPLES 15 AND 16

In the same manner as described in Example 13, 20% by weight of dolomite is incorporated at a cylinder temperature of 270° C. in 80% by weight of polyethylene terephthalate (PETP) which has a viscosity number of 140 cm³/g (Example 15). The processing to moulded articles is carried out under the following conditions: cylinder temperature 270° C., mould temperature 140° C., cycle time 60 sec. In the same manner, moulded articles which contain no dolomite are prepared and the properties are determined (Example 16). It is evident from Table 4 that the modulus of elasticity, the dimensional stability under heat and the tracking resistance are improved.

TABLE 4

| Example | Composition | Modulus of elasticity (DIN 53 547) 23° C. (N/mm$^2$) | Dimensional stability under heat ISO/R 75 Method B (°C.) | Combustibility (UL 94) thickness of sample 1/16 ins. | Tracking resistance (DIN 53 480 Method KC) |
|---|---|---|---|---|---|
| 13 | 80% by weight of PBTP copolymer+ with 8% by weight of Sb$_2$O$_3$, based on the copolymer 20% by weight of dolomite | 3400 | 145 | V-O | 375 |
| 14 | 100% by weight of PBTP copolymer with 8% by weight of Sb$_2$O$_3$, based on the copolymer | 2700 | 135 | V-O | 225 |
| 15 | 80% by weight of PETP 20% by weight of dolomite | 4100 | 180 | | 350 |
| 16 | 100% by weight of PETP | 3000 | 170 | | 300 |

+co-component: 7 mol. % of 1,3-bis(2-hydroxyethyl)-4,5,6,7-tetrabromo-benzimidazolone diol, based on dimethyl terephthalate

What is claimed is:

1. A molding composition based on thermoplastic polyesters which consists of
   (a) 40 to 99% by weight of a poly(alkylene terephthalate), and
   (b) 1 to 60% by weight of dolomite; or
   (c) 40 to 99% by weight of a poly(alkylene terephthalate), and
   (d) 1 to 60% by weight of dolomite plus glass fibers, with all percentages by weight being based on the total composition.

2. A moulding composition according to claim 1, wherein the polyester is a polyethylene terephthalate or poly-1,4-butylene terephthalate or a copolyester based on polyethylene terephthalate and poly-1,4-butylene terephthalate.

3. A moulding composition according to claim 1, which contains 20 to 40% by weight of dolomite.

4. A moulding composition according to claim 1, which contains 15 to 30% by weight of dolomite and 15 to 20% by weight of glass fibres.

* * * * *